US012750308B2

(12) United States Patent
Wang et al.

(10) Patent No.: US 12,750,308 B2
(45) Date of Patent: Sep. 29, 2026

(54) COMMUNICATION METHOD AND APPARATUS

(71) Applicant: NEW H3C TECHNOLOGIES CO., LTD., Zhejiang (CN)

(72) Inventors: Meng Wang, Beijing (CN); Haifeng Zhao, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 125 days.

(21) Appl. No.: 18/813,536

(22) Filed: Aug. 23, 2024

(65) Prior Publication Data

US 2025/0071049 A1 Feb. 27, 2025

(30) Foreign Application Priority Data

Aug. 25, 2023 (CN) ......................... 202311083073.7

(51) Int. Cl.
*H04L 45/24* (2022.01)
*H04L 45/02* (2022.01)
*H04L 45/12* (2022.01)

(52) U.S. Cl.
CPC .......... *H04L 45/245* (2013.01); *H04L 45/026* (2013.01); *H04L 45/124* (2013.01)

(58) Field of Classification Search
CPC ... H04L 45/245; H04L 45/026; H04L 45/124; H04L 45/24; H04L 45/247; H04L 45/58; H04L 45/745; H04L 45/28; H04L 45/22
See application file for complete search history.

(56) References Cited

U.S. PATENT DOCUMENTS

| | | | | |
|---|---|---|---|---|
| 11,606,390 | B1 * | 3/2023 | Grammel | H04L 45/28 |
| 12,244,642 | B1 * | 3/2025 | Grammel | H04L 45/60 |
| 2004/0085893 | A1 * | 5/2004 | Wang | H04L 49/1523 370/216 |
| 2005/0265330 | A1 * | 12/2005 | Suzuki | H04L 49/555 370/537 |

(Continued)

FOREIGN PATENT DOCUMENTS

| | | | |
|---|---|---|---|
| WO | 2016122934 | A1 | 8/2016 |
| WO | 2017149364 | A1 | 9/2017 |

OTHER PUBLICATIONS

European Patent Office, Extended European Search Report Issued in Application No. 24196161.4, Jan. 17, 2025, Germany, 14 pages.

*Primary Examiner* — Vivek Srivastava
*Assistant Examiner* — Wuji Chen
(74) *Attorney, Agent, or Firm* — Greenblum & Bernstein, P.L.C.

(57) ABSTRACT

A communication method, and a communication apparatus are provided. A first network apparatus forwards traffic based on a first forwarding entry in response to a determination that the first forwarding entry for forwarding traffic is not aged. The first network apparatus sends a first packet, in response to a determination that the first network apparatus is a network apparatus performing traffic switchover, to a third network apparatus so that the third network apparatus is to regenerate a forwarding path to reach a target network apparatus through the second network apparatus. The third network apparatus is an apparatus accessed by both the first network apparatus and the second network apparatus, and a path from the third network apparatus to the first network apparatus and a path from the third network apparatus to the second network apparatus are equal-cost paths.

8 Claims, 5 Drawing Sheets

(56) References Cited

U.S. PATENT DOCUMENTS

2006/0168317 A1* 7/2006 Charzinski .............. H04L 45/18 709/241
2013/0259056 A1* 10/2013 Kotrabasappa ......... H04L 45/28 370/389
2013/0332573 A1* 12/2013 Hegland ................. H04L 69/40 709/218
2014/0071834 A1* 3/2014 Sun ....................... H04L 41/065 370/242
2014/0369186 A1* 12/2014 Ernstrom ................ H04L 49/55 370/228
2015/0156108 A1* 6/2015 Shi ........................ H04L 12/185 370/218
2015/0188808 A1* 7/2015 Ghanwani ........... H04L 12/4675 709/244
2016/0020939 A1* 1/2016 Ramasubramanian ...................... H04L 41/0659 370/217
2016/0105306 A1* 4/2016 Wu ..................... H04L 12/6418 370/221
2016/0218957 A1* 7/2016 Liang ...................... H04L 45/02
2016/0241463 A1* 8/2016 D'Souza ............... H04L 45/021
2017/0063672 A1* 3/2017 Chhabra ............. H04L 41/0663
2019/0253381 A1* 8/2019 Ji ........................... H04L 45/22
2019/0363975 A1* 11/2019 Djernaes ............... H04L 45/033
2020/0044960 A1* 2/2020 Lin ..................... H04L 41/0663
2020/0186460 A1* 6/2020 Power ................. H04L 41/0659
2020/0396159 A1* 12/2020 Rao ..................... H04L 12/4641
2024/0195727 A1* 6/2024 Yuksel .................. H04L 45/123
2025/0071049 A1* 2/2025 Wang .................... H04L 45/245
2025/0374279 A1* 12/2025 Govindan ............... H04L 47/12

* cited by examiner

COMMUNICATION METHOD AND APPARATUS

CROSS REFERENCE TO RELATED APPLICATIONS

This application claims priority to Chinese Patent application No. 202311083073.7, filed on Aug. 25, 2023, the disclosure of which is incorporated herein by reference in its entirety for all purposes.

TECHNICAL FIELD

This disclosure relates to the field of communications, particularly to a communication method and apparatus.

BACKGROUND

Multi-Chassis Link Aggregation Group (M-LAG) is a mechanism to virtualize two physical apparatuses into one system through a multi-chassis link aggregation. Two apparatuses may aggregate links to form the multi-chassis link aggregation to improve link reliability from board-level to device-level.

In Layer 2 networks, the M-LAG may operate as a horizontal virtualization technology. The M-LAG logically virtualizes two apparatuses into a single virtual apparatus, performing as one Layer 2 logical node. The M-LAG may provide a loop-free Layer 2 topology and a redundant backup without complex Spanning Tree Protocol (STP) configurations, and may simplify networking and configurations.

FIG. 1 is a block diagram of a network with an M-LAG that may be implemented by prior art. A network apparatus A and a network apparatus B may provide a load-balancing and distribute traffic. When one of the network apparatuses fails, traffic can be quickly switched to the other one to provide normal services. The network apparatuses in the M-LAG are neighbors to each other, wherein the network apparatus A is a primary apparatus, and network apparatus B is a secondary apparatus.

FIG. 2 is a block diagram of a network with an M-LAG in a Spine-Leaf architecture. Traffic forwarding between Spine node and Leaf is implemented via Ethernet Virtual Private Network (EVPN) or traditional Layer 3 Equal-Cost Multi-Path (ECMP). Traffic forwarding between the Leafs and Server is implemented via M-LAG network. The Peerlink between Leaf1 and Leaf2 is used for forwarding protocol packets, but not for data traffic.

When the Peerlink fails, prior art typically uses a multi-active detection (MAD) mechanism to prevent the secondary apparatus from continuing to forward traffic. A Leaf1 and a Leaf2 may perform conflict detections via a Keepalive link, uplink and downlink interfaces of the Leaf2, which has the lower priority, may be set with a MAD DOWN state, i.e., uplink and downlink interfaces of the Leaf2 are shut down, to prevent traffic forwarding errors and reduce the impact on services.

SUMMARY

In view of this, the present disclosure provides a communication method and apparatus for solving the problem of packet loss of traffic and its impact on business during the uplink and downlink interface shutdown process of the existing MAD mechanism.

According to a first aspect of the present disclosure, a communication method is provided, which is applied to a first network apparatus in a network of a Multichassis Link Aggregation Group (M-LAG), the network of the M-LAG further comprises a second network apparatus, wherein a Peerlink link established between the first network apparatus and the second network apparatus is faulty, the method comprises:

forwarding, by the first network apparatus in response to a determination that a first forwarding entry for forwarding traffic is not aged, the traffic based on a first forwarding entry;

sending, by the first network apparatus in response to a determination that the first network apparatus is a network apparatus performing traffic switchover, a first packet to a third network apparatus so that the third network apparatus is to regenerate a forwarding path to reach a target network apparatus through the second network apparatus;

wherein the third network apparatus is an apparatus accessed by both the first network apparatus and the second network apparatus, and a path from the third network apparatus to the first network apparatus and a path from the third network apparatus to the second network apparatus are equal-cost paths.

According to a second aspect of the present disclosure, a communication apparatus is provided, the communication apparatus being applied to a first network apparatus in a network of a Multichassis Link Aggregation Group (M-LAG); the network of the M-LAG further comprises a second network apparatus, wherein a Peerlink link established between the first network apparatus and the second network apparatus is faulty, the communication apparatus including a processor and a machine-readable storage medium, where the machine-readable storage medium stores machine executable instructions executable by the processor, the processor is configured to forward traffic based on a first forwarding entry comprised in the first network apparatus in response to the first forwarding entry for forwarding the traffic is not aged; send a first packet to a third network apparatus in response to determining that the first network apparatus is a network apparatus performing traffic switchover, so that the third network apparatus is to regenerate a forwarding path to reach a target network apparatus through the second network apparatus;

wherein the third network apparatus is an apparatus accessed by both the first network apparatus and the second network apparatus, and a path from the third network apparatus to the first network apparatus and a path from the third network apparatus to the second network apparatus are equal-cost paths. Therefore, by applying the communication method and the apparatus provided in the present disclosure, when the first forwarding entry included in a first network apparatus and used for forwarding traffic has not been aged, traffic is forwarded by the first network apparatus based on the first forwarding entry. If it is determined that the first network apparatus is the network apparatus performing traffic switchover, the first network apparatus sends the first packet to the third network apparatus, where the first packet is to cause the third network apparatus to regenerate a forwarding path to reach a target network apparatus through the second network apparatus. The third network apparatus is an apparatus accessed by both the first network apparatus and the second network apparatus, and a path from the third network apparatus to the first network apparatus and a path from the third network apparatus to the second network apparatus are equivalent paths.

As such, in an M-LAG network without traffic on the Peerlink link, if a Peerlink fault occurs, by determining the network apparatus for performing traffic switchover, the traffic in the network apparatus can be seamlessly switched, achieving zero packet loss without affecting services. This solves the problem of packet loss of traffic and its impact on the services during the process of the uplink and downlink interfaces in the exiting MAD mechanism.

DETAILED DESCRIPTION

Figure 1:
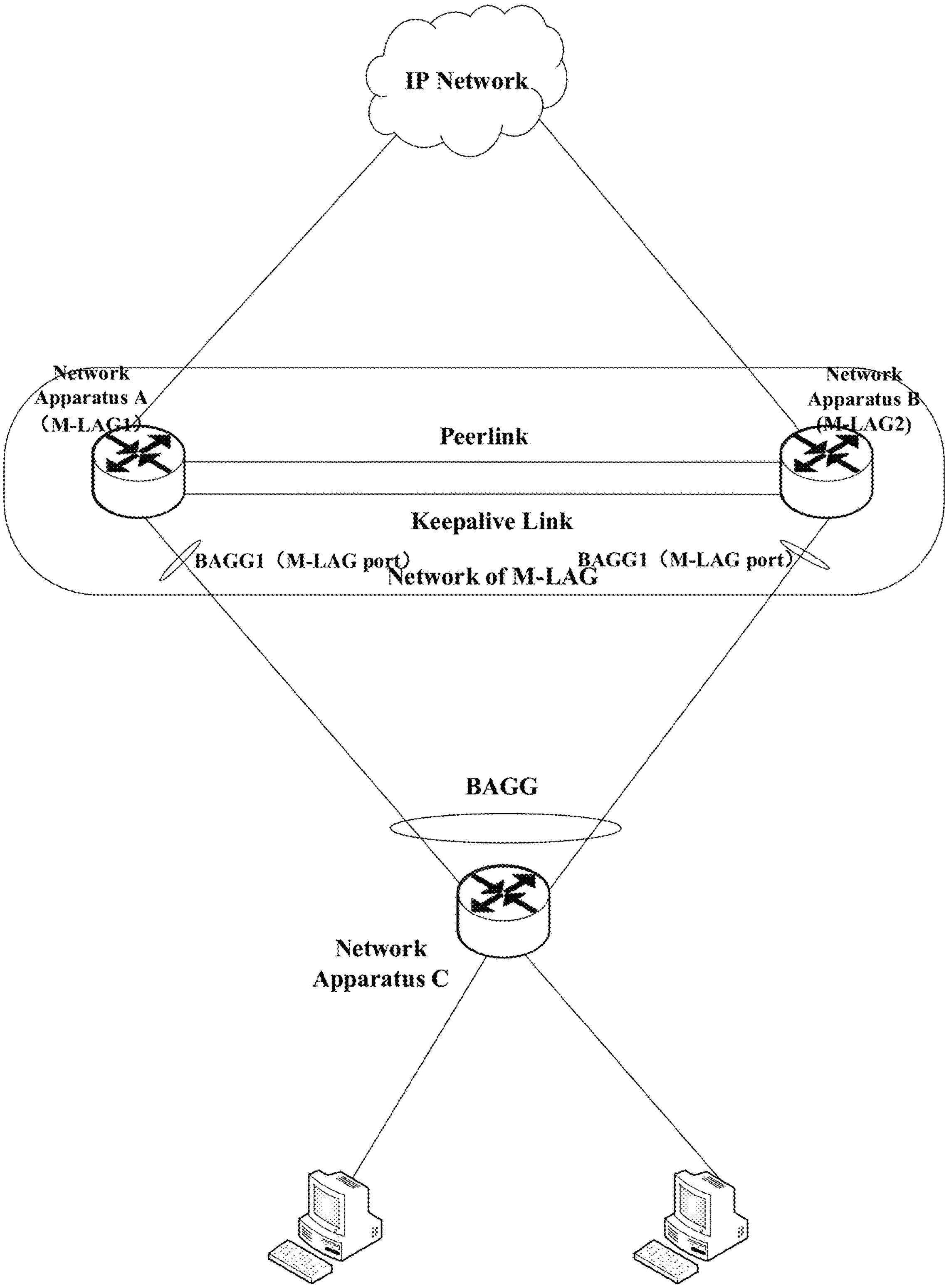
FIG. 1 is a schematic diagram of a network of an M-LAG provided by prior art.

Illustrative examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are merely examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a", 'said", and "the" used in the present disclosure and the appended claims are further intended to include multiple, unless the context clearly indicates otherwise. It is also to be understood that the term "and/or" as used herein refers to any or all possible combinations that include one or more associated listed items. It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

Figure 3:
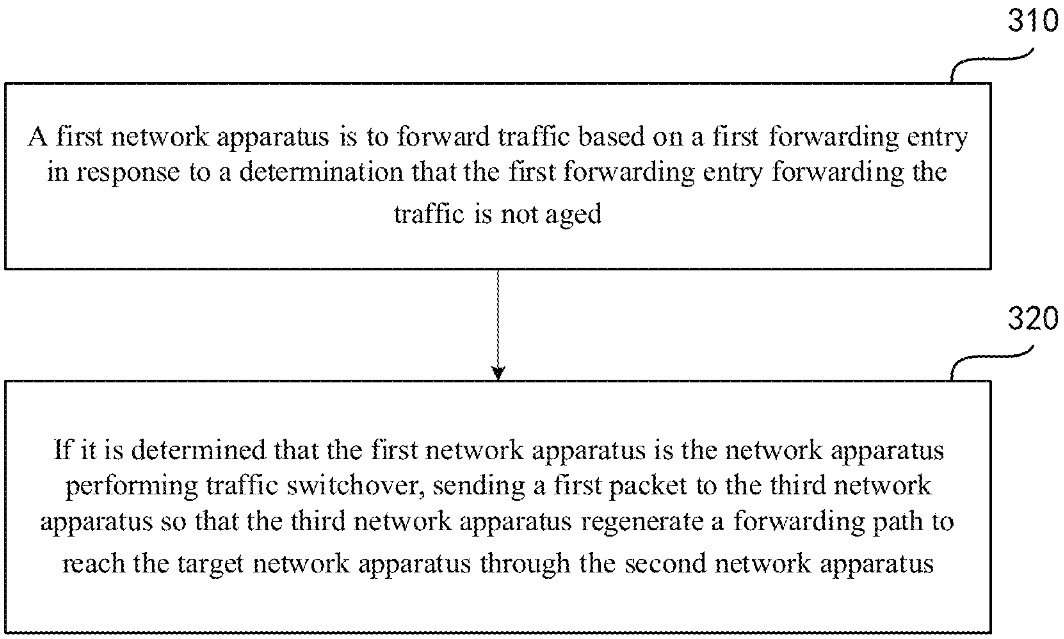
FIG. 3 is a flowchart of a communication method based on an example of the present disclosure.

The communication method based on an example of the present disclosure will be described in detail below. Refer to FIG. 3, which is a flowchart of a communication method based on an example of the present disclosure. The method provided in an example of the present disclosure may be applied a first network apparatus and may include the following processes:

The MAD mechanism may lead to the following issues: the MAD is a coordination mechanism, and it may lead to packet loss in traffic during the shutdown of the uplink and downlink interfaces (there is a time difference in down events of the uplink and downlink interfaces, the traffic entering the Leaf2 cannot be forwarded to the leaf1 after the Peerlink interface fails) thereby impacting services. At process 310, a first network apparatus is to forward traffic based on a first forwarding entry in response to a determination that the first forwarding entry included in the first network apparatus for forwarding the traffic is not aged.

The first network apparatus is in a network of an M-LAG. A second network apparatus is also in the network of the M-LAG. Both the first network apparatus and the second network apparatus may access to a third network apparatus, thus constituting equal-cost paths. A Peerlink link and a Keepalive link are established between the first and second network apparatuses. A target network apparatus may access to the first and second network apparatuses through a link aggregation group.

When the Peerlink link fails, ports of the Peerlink link on the first and second network apparatuses will be down. Because of the Peerlink link ports, the first and second network apparatuses may perceive the Peerlink link failure.

Since the first and second network apparatuses have already synchronized entries of a Medium Access Controller (MAC) address table, an Address Resolution Protocol (ARP) table, a routing table, a forwarding table, etc., in real-time via the Peerlink link, the first and second network apparatuses may respectively forward upstream traffic and downstream traffic based on local first forwarding entries as long as these entries have not aged out. The upstream traffic refers to the traffic sent from the target network apparatus to the third network apparatus; the downstream traffic refers to the traffic sent from the third network apparatus to the target network apparatus.

It should be noted that Layer 2 forwarding is implemented between the first and second network apparatuses and the target network apparatus through an MAC address table; Layer 3 forwarding is implemented between the first and second network apparatuses and the third network apparatus through a forwarding table.

In this process, when the forwarding entries of the first and second network apparatuses are not aged, the first and second network apparatuses may forward the upstream and downstream traffic as the Peerlink link is functioning normally, without performing any other actions. The forwarding process may refer to the existing forwarding process and will not be repeated here.

At process 320, if it is determined that the first network apparatus is a network apparatus performing traffic switchover, a first packet is sent to the third network apparatus so that the third network apparatus regenerates a forwarding path to reach the target network apparatus through the second network apparatus.

Based on description of process 310, during a time period after the first network apparatus perceives the Peerlink failure and during which the local first forwarding entry for forwarding traffic is not aged, the first and second network apparatuses may re-calculate their respective roles within the network of M-LAG through the Keepalive link, and accordingly, may determine one of the first and second network apparatuses as the network apparatus for performing traffic switchover.

If it is determined that the first network apparatus is the network apparatus performing traffic switchover, the first network apparatus may generate the first packet and send it to the third network apparatus so that the third network apparatus is to regenerate the forwarding path to reach the target network apparatus through the second network apparatus.

Thus, the downstream traffic to be sent from the third network apparatus to the target network apparatus is switched to the second network apparatus for forwarding, without passing through the first network apparatus.

In some examples, the first network apparatus may send an LACP packet to the target network apparatus so that the upstream traffic to be sent from the target network apparatus to the third network apparatus is switched to the second network apparatus for forwarding, without passing through the first network apparatus.

In the present disclosure, the first network apparatus includes a first port, and the target network apparatus includes a second port. A communication link is established between the first port and the second port belonging to a same aggregation group. The target network apparatus may further include a third port that belongs to the aggregation group and has established a communication link with the second network apparatus, which includes a fourth port. A communications link is established between the fourth port and the third port.

The first network apparatus may generate a Link Aggregation Control Protocol (LACP) packet carrying a port status of the first port. Based on the existing LACP protocol, a port status field may consist of 8 bits, that is, from bit A to bit H, where the D bit is a Synchronization (Sync) bit indicating whether the current port aggregation is completed. The first network apparatus may set a value of the Sync bit to 0 to indicate the first port has not completed aggregation. Other fields of the LACP packet are set based on the LACP protocol requirements.

Through the first port, the first network apparatus may send the LACP packet to the target network apparatus. The target network apparatus may receive the LACP packet through the second port and acquire the port status of the first port from the LACP packet. Based on the port status, the target network apparatus determines that the first port has not completed aggregation and disables the sending and the receiving functions of the second port on the communication link, i.e. E bit and F bit of the second port are set to 0.

The first network apparatus, after sending the LACP packet, sets the first port as a non-selected port.

The sending and receiving functions of the second port on the communication link are disabled, the upstream traffic can no longer reach the first network apparatus through the communication link between the first port and the second port. Instead, the upstream traffic can reach the second network apparatus through the third port. In this way, it can be achieved that the upstream traffic to be sent from the target network apparatus to the third network apparatus is switched to the second network apparatus for forwarding without passing through the first network apparatus.

Thus, by applying the communication method provided in the present disclosure, when the first forwarding entry included in the first network apparatus and used for forwarding traffic has not aged out, the traffic is forwarded by the first network apparatus based on the first forwarding entry. If it is determined that the first network apparatus is the network apparatus performing traffic switchover, the first network apparatus may send the first packet to the third network apparatus so that the third network apparatus regenerates a path to the target network apparatus through the second network apparatus. The third network apparatus is an apparatus accessed by both the first network apparatus and the second network apparatus, and the paths from the third network apparatus to both the first network apparatus and the second network apparatus are equal-cost paths.

In this way, in an M-LAG network without traffic on the Peerlink link, if a Peerlink fault occurs, the traffic in the network apparatus can be seamlessly switched to achieve zero packet loss and no impact on the service by determining the network apparatus performing traffic switchover. This solves the problem of packet loss and service impact caused by the MAD mechanism in the existing interface shutdown process.

Optionally, after process 310 of the embodiment of present disclosure, the method may further include a process in which network apparatuses recalculate their roles and determine the network apparatus responsible for executing traffic switchover based on their roles.

Specifically, the first network apparatus may acquire its first apparatus attribute. The second network apparatus further acquires its second apparatus attribute and generates a first Keepalive packet that includes the second apparatus attribute of the second network apparatus.

The second network apparatus may send the first Keepalive packet to the first network apparatus through the Keepalive link. After the first network apparatus receives the first Keepalive packet, the first network apparatus may acquire the second apparatus attribute from the first Keepalive packet.

Furthermore, the specific process of the first network apparatus determining itself as the network apparatus performing traffic switchover includes:

The first network apparatus may compare the apparatus attributes of the first and second apparatuses. If the attribute relationship indicates that the second network apparatus is a master apparatus and the first network apparatus is a slave apparatus, the first network apparatus determines itself as the network apparatus performing traffic switchover.

It can be understood that after the first network apparatus acquires the first apparatus attribute, it further generates a second Keepalive packet that includes the first apparatus attribute. Through the Keepalive link, the first network apparatus may send the second Keepalive packet to the second network apparatus. After the second network apparatus receives the second Keepalive packet, it may acquire the first apparatus attribute. The second network apparatus may compare the apparatus attributes of the first and second apparatuses. If the attribute relationship indicates that the second network apparatus is the master apparatus and the first network apparatus is the slave apparatus, the second network apparatus determines itself not to be the network apparatus performing traffic switchover.

The specific process for the network apparatuses to recalculate their own roles is similar to the process in which an existing network apparatus recalculates its own role. It is briefly described here.

The apparatus attributes include M-LAG interface status of both apparatuses, initial roles of both apparatuses, M-LAG MAD DOWN status, apparatus health values, role priorities, and apparatus bridge MAC addresses.

When calculating apparatus roles through Keepalive link packet exchanges, the following factors are sequentially considered: 1) Comparing the status of all M-LAG interfaces of the apparatuses; the apparatus with a working M-LAG interface is preferred; 2) Comparing previous roles; if one apparatus is Primary and the other is None, the Primary apparatus is preferred; 3) Comparing M-LAG MAD DOWN status; if one apparatus has an interface in M-LAG MAD DOWN status, while the other does not have an interface in M-LAG MAD DOWN status, the apparatus without the M-LAG MAD DOWN interface is preferred; 4) Comparing apparatus health status; the apparatus with the lower health value is preferred. The apparatus's health value can be checked using the display system health command, with the lower health value indicating the healthier apparatus; when the apparatus runs without faults, the health value is 0; 5) Comparing role priority, the apparatus with the higher role priority is preferred; 6) Comparing the apparatus bridge MAC addresses, the apparatus with the smaller bridge MAC address is preferred.

The above factors are considered sequentially, and the apparatus with the most advantageous result is assigned the Primary role, becoming the master apparatus, and the other apparatus is assigned the Secondary role, becoming the slave apparatus.

Optionally, in the embodiment of the present disclosure, the first network apparatus, before performing step 320, further performs the process of sending the first packet to the third network apparatus based on the Layer 3 protocol relationship between itself and the third network apparatus, so that the third network apparatus updates local routing and forwarding tables based on the first packet, ensuring that downlink traffic is no longer forwarded to the first network apparatus.

In one possible implementation, BGP neighbor relationships are established between each two of the first, second, and third network apparatuses. Based on the existing BGP protocol, the first and second network apparatuses respectively synchronize routes to reach the target network apparatus to the third network apparatus. The third network apparatus, after receiving the multiple routes to reach the target network apparatus, selects the best route. In the embodiment of the present disclosure, these routes form equal-cost routes (ECMP, Equal-Cost Multi-Path routing). The third network apparatus stores the ECMP entries (referred to as second routing entry) to reach the target network apparatus in its routing table (referred to as the second routing table), where the second routing entry includes two sub-routing entries, each representing a route. Based on the second routing entry, the third network apparatus generates corresponding forwarding entry (referred to as second forwarding entry) in the forwarding table, where the second forwarding entry includes two sub-forwarding entries, each corresponding to one sub-routing entry.

Similarly, the first and second network apparatuses further synchronize routes to reach the target network apparatus to each other and store the routing entries (referred to as the first routing entries) in their respective routing tables (referred to as the first routing tables).

After the first network apparatus determines itself to be the network apparatus performing traffic switchover, the first network apparatus needs to withdraw the previously sent route indicating the path to the target network apparatus through itself, to ensure the third network apparatus reroutes the downlink traffic through the second network apparatus.

Therefore, the first network apparatus may acquire the first routing entry to reach the target network apparatus from the first routing table. This first routing entry indicates a path to reach the target network apparatus through the first network apparatus. The first network apparatus generates a route withdrawal packet, which includes a first route. That is, in process 320 described above, the specific first packet generated by the first network apparatus is the route withdrawal packet.

Based on the existing BGP protocol, the first network apparatus may send the route withdrawal packet to the third network apparatus. Upon receiving the route withdrawal packet, the third network apparatus may acquire the first route and deletes the sub-routing entry corresponding to the first route from the second routing table. The third network apparatus then deletes the corresponding sub-forwarding entry from the forwarding table based on the sub-routing entry.

As a result, the third network apparatus no longer stores the routing entries and forwarding entries for reaching the target network apparatus through the first network apparatus. The downstream traffic destined for the target network apparatus is forwarded through the second network apparatus.

In another possible implementation, the first, second, and third network apparatuses establish Open Shortest Path First (OSPF) neighbor relationships with each other. Based on the existing OSPF protocol, the first and second network apparatuses respectively synchronize their local Link State Databases (LSDB) to the third network apparatus. The local LSDB includes the state of the prefix reaching the target network apparatus (where the prefix specifically refers to the prefix of the target network apparatus) and the cost value. After the third network apparatus receives the local LSDBs from the first and second network apparatuses, it stores the contents in the received LSDBs into its local LSDB. The third network apparatus converts the LSDB into a weighted directed graph, which accurately reflects the whole network topology. According to the weighted directed graph, the third network apparatus employs the SPF algorithm to calculate the shortest-path tree rooted at itself, which provides the routes to each network apparatus. This shortest-path tree includes the second route from the third network apparatus to the target network apparatus.

In the embodiment of present disclosure, the second routes to the target network apparatus calculated by the third network apparatus are ECMP routes. The third network apparatus can forward downstream traffic to the target network apparatus via both the first and second network apparatuses. In its routing table (referred to as the second routing table), the third network apparatus stores the ECMP routing entries to the target network apparatus (referred to as the second routing entry, including two sub-routing entries, each representing a route). Correspondingly, the third network apparatus generates a forwarding entry (referred to as the second forwarding entry, including two sub-forwarding entries, each corresponding to a sub-routing entry) in the forwarding table based on the second routing entry.

Similarly, the first and second network apparatuses are further to receive LSDBs from other OSPF neighbors and store the contents in the received LSDBs in their local LSDBs. Each network apparatus calculates a shortest-path tree rooted at itself using the SPF algorithm based on its local LSDB. This shortest-path tree includes the first route from the first or second network apparatus to the target network apparatus.

Each LSDB includes prefix entries consisting of prefixes and cost values. For example, the LSDB within the first network apparatus contains the first prefix entry, and the LSDB within the third network apparatus contains the second prefix entry.

Upon determining that the first network apparatus needs to perform traffic switchover, the first network apparatus need to update the previously sent prefix entry for reaching the target network apparatus through itself to cause the third network apparatus to choose the second network apparatus for forwarding downstream traffic.

Therefore, the first network apparatus may acquire the first prefix entry for reaching the target network apparatus from the LSDB and update the first cost value included in the first prefix entry to a second cost value (e.g., $2^{24}-1$, which is the maximum cost value specified by the OSPF protocol). The updated first prefix entry still indicates a path to the target network apparatus through the first network apparatus.

Based on the updated first prefix entry, the first network apparatus updates its local shortest-path tree, including the updated first route. The updated first route still indicates the path to the target network apparatus through the first network apparatus, with the second cost value.

The first network apparatus generates the first packet, which includes the updated first prefix entry. That is, in process 320 described above, the first packet generated by the first network apparatus can specifically be a Link-State Advertisement (LSA).

Based on the existing OSPF protocol, the first network apparatus may send the LSA to the third network apparatus. After receiving the LSA, the third network apparatus may acquire the updated first prefix entry therein. Based on this updated first prefix entry, the third network apparatus retrieves the corresponding second prefix entry from the LSDB and updates a third cost value included in the second prefix entry to the second cost value. The third network apparatus then updates its local shortest-path tree based on the updated second prefix entry, where the shortest-path tree includes the updated second route. Based on the updated second route, the third network apparatus deletes the sub-routing entry included in the second routing entry from the second routing table, and deletes the corresponding sub-forwarding entry from the forwarding table based on the sub-routing entry. The update specifically includes updating the cost values in the shortest-path tree, the second routing entry, and the second forwarding entry, so that there are no longer any ECMP routes, ECMP routing entries, or ECMP forwarding entries.

In this way, the downstream traffic destined for the target network apparatus will be forwarded through the second network apparatus from the third network apparatus.

Figure 4:
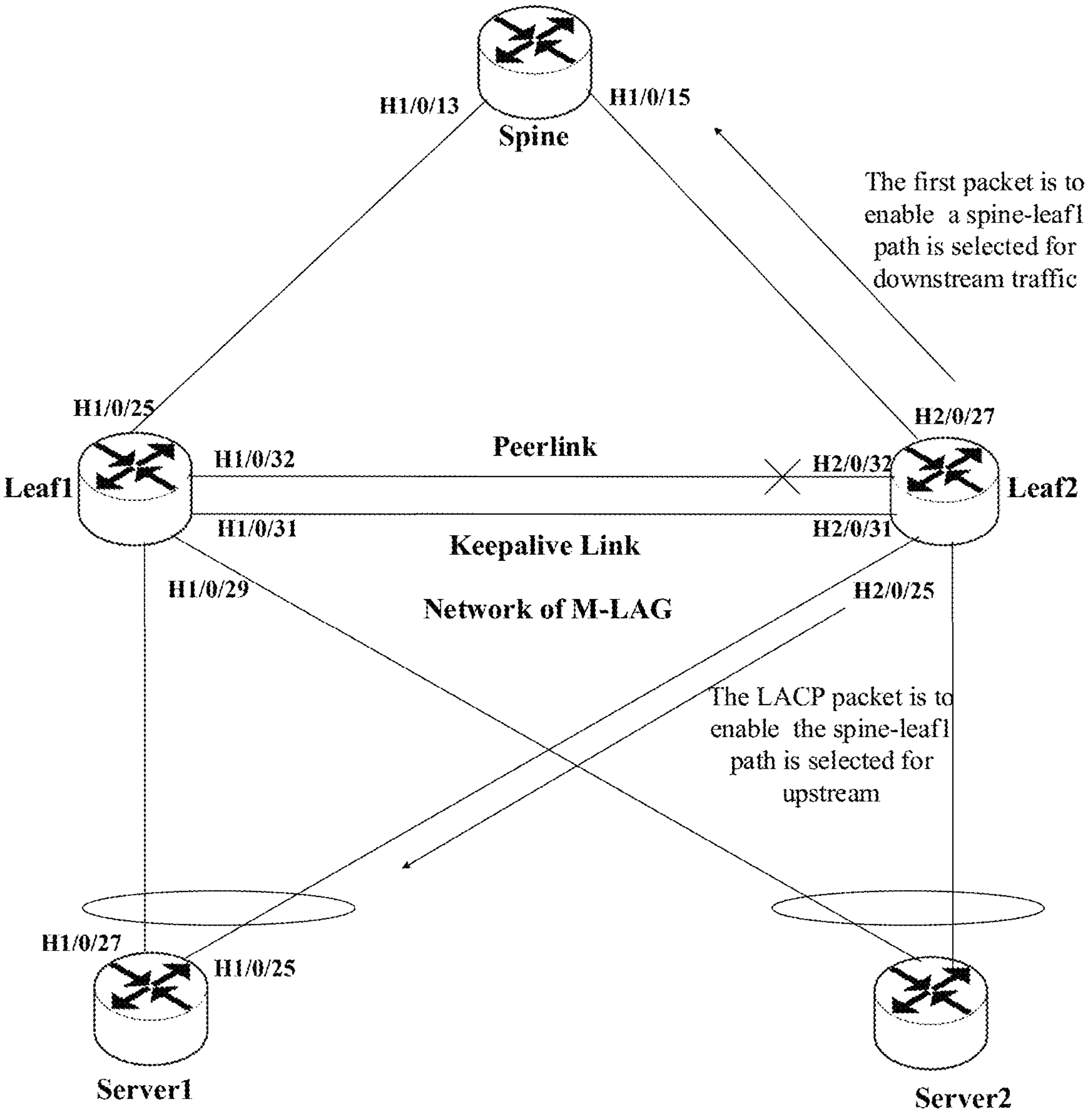
FIG. 4 is a schematic diagram of a network of an M-LAG in a Spine-Leaf architecture based on an example of the present disclosure.

A detailed explanation of the communication method provided in this embodiment follows. Refer to FIG. 4, which illustrates an example of the M-LAG networking in the Spine-Leaf architecture based on this embodiment of the present disclosure.

In FIG. 4, both Leaf1 and Leaf2 are accessed to the Spine. The routes to Leaf1 and Leaf2 from the Spine form equal-cost routes. The traffic forwarding between the Spine and the Leafs is done via Ethernet Virtual Private Network (EVPN) or the traditional Layer 3 ECMP mechanism.

Leaf1 and Leaf2 are part of an M-LAG (Multi-chassis Link Aggregation) network. Leaf1 and Leaf2 constitute load balancing and jointly forward traffic. In case one of network apparatuses fails, traffic can quickly be switched to the other network apparatus, ensuring normal service operation. In the M-LAG network, Leaf1 and Leaf2 are neighbors to each other, where Leaf1 acts as the primary apparatus and Leaf2 as the secondary apparatus. A Keepalive link and a Peerlink have been established between Leaf1 and Leaf2.

Both Server1 and Server2 are accessed to the M-LAG network via link aggregation. The M-LAG network forwards traffic between the Leafs and the Servers. Under normal conditions, the Peerlink between Leaf1 and Leaf2 forwards no traffic and is only used for protocol packet exchanges.

If the Peerlink fails, the Peerlink ports on both Leaf1 and Leaf2 go down. Leaf1 and Leaf2 detect this failure via their respective Peerlink ports.

Since Leaf1 and Leaf2 had previously synchronized their table entries (MAC address table, ARP table, routing table, forwarding table, etc.) through the Peerlink in real-time, they can continue to forward upstream and downstream traffic based on their local MAC address tables and forwarding tables as long as these entries have not aged out. Upstream traffic flows from the Servers to the Spine, while downstream traffic flows from the Spine to the Servers.

Notably, Leaf1 and Leaf2 perform Layer 2 forwarding with the Server (using MAC address tables); Leaf1 and Leaf2 perform Layer 3 forwarding with the Spine (using routing tables).

When Layer 2/Layer 3 forwarding entries have not aged out, Leaf1 and Leaf2 perform no additional actions and continue to forward traffic as if the Peerlink were operational. This forwarding process follows conventional forwarding procedures, which are not repeated here.

For example, consider Leaf2 and Server1. When Leaf2 detects the Peerlink failure, and the local forwarding entries for traffic have not timed out, Leaf1 and Leaf2 re-evaluate their respective roles in the M-LAG network over the Keepalive link, and determine a network apparatus responsible for executing traffic switchover. The process for determining the traffic switchover apparatus may refer to the descriptions in the previous embodiment and is not repeated here.

If Leaf2 is determined to execute the traffic switchover, it generates a first packet and may send it to the Spine. This first packet prompts the Spine to regenerate the forwarding path to the target network apparatus, specifically to reach Server1 through Leaf2.

For instance, Leaf1, Leaf2, and the Spine have established BGP neighbor relationships with each other. Based on the existing BGP protocol, Leaf1 and Leaf2 respectively synchronize their routes to reach Server1 to the Spine. Upon receiving the multiple routes to reach Server1, the Spine selects the optimal route. In this embodiment, these multiple routes form ECMP. The Spine stores ECMP routing entries (may be referred to as second routing entry) to reach Server1 in its routing table (may be referred to as the second routing table) where the second routing entry includes two sub-routing entries, each representing a route. And based on the second routing entry, the Spine generates corresponding forwarding entry (may be referred to as the second forwarding entry) in the forwarding table, where the second forwarding entry includes two sub-forwarding entries, each corresponding to a sub-routing entry.

Similarly, Leaf1 and Leaf2 further synchronize their routes to reach Server1 to each other and store the routing entries (may be referred to as the first routing entries) in their respective routing tables (may be referred to as first routing tables).

When Leaf2 is determined to perform traffic switchover, it needs to withdraw its previously sent route to reach Server1 so that the Spine can select Leaf1 for forwarding downstream traffic.

Therefore, Leaf2 retrieves the first routing entry to reach Server1 from the first routing table. This entry indicates a path through Leaf2 to Server1. Leaf2 generates a route withdrawal packet that includes the first route.

Based on the existing BGP protocol, Leaf2 may send the route withdrawal packet to the Spine. Upon receiving this packet, the Spine extracts the first route and deletes the corresponding sub-routing entries from the second routing table. Then, the Spine deletes the corresponding sub-forwarding entries from the forwarding table based on the sub-routing entries.

As the result, the Spine no longer stores the routing entries and forwarding entries for reaching Server1 via Leaf2. Downstream traffic destined for Server1 will henceforth be forwarded through Leaf1. The downstream traffic from the Spine to Server is redirected to Leaf1, without passing through Leaf2.

Similarly, if OSPF neighbor relationships are established between Leaf1, Leaf2, and the Spine, the traffic switchover process described in the previous embodiment applies here, which are not repeated.

While sending the route withdrawal packet to the Spine, Leaf2 may generate an LACP packet and send it to Server1 via ports in the aggregation group to switch upstream traffic from Server1 to the Spine via Leaf1, without passing through Leaf2.

Figure 2:
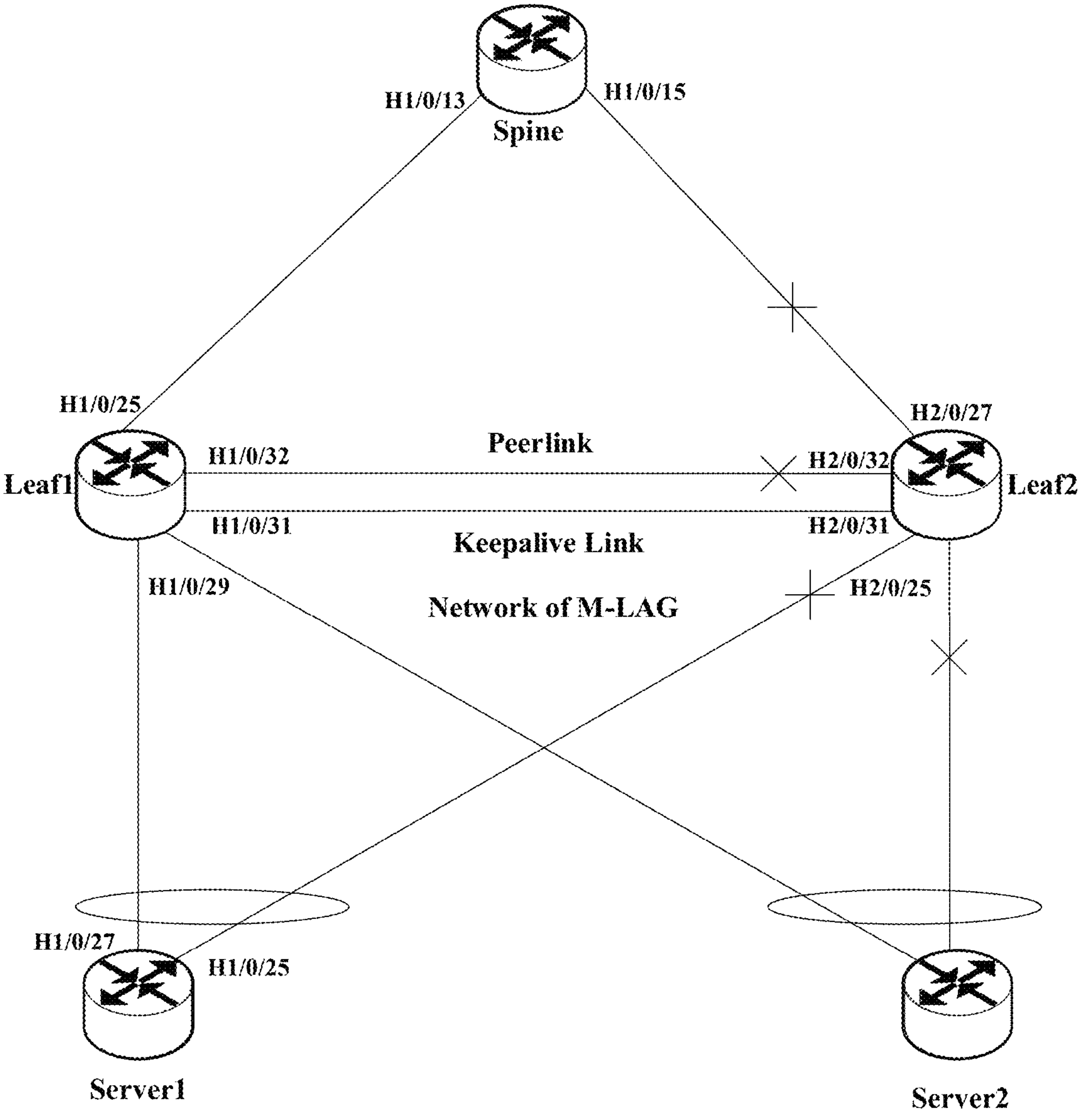
FIG. 2 is a schematic diagram of a network of an M-LAG in a Spine-Leaf architecture.

As shown in FIG. 2, Leaf2 includes the first port (H2/0/25), and Server1 includes the second port (H1/0/25); the communication link has been established between the first and second ports, and both ports belong to a same aggregation group. Notably, Server1 further includes the third port (H1/0/27), which also belongs to the same aggregation group and has established a communication link with Leaf1.

Leaf2 may generate the LACP packet that includes the port status of the first port. Based on the LACP protocol, the port status field occupies 8 bits, that is, from bit A to bit H. Where the D-bit is the Synchronization bit (Sync bit), and indicates whether the port's aggregation is complete. Leaf2 sets the Sync bit to 0 to signify that the first port's aggregation is not complete. Other fields comprised in the LACP packet are configured per the existing LACP protocol.

Leaf2 may send the LACP packet through the first port to Server1. Upon receiving the LACP packet through the second port, Server1 extracts the port state of the first port. Server1 determines that the first port's aggregation is not complete based on the port state and disables the communication capabilities (sending and receiving) of the second port on the connection link, i.e. setting bits E and F to 0.

After sending the LACP packet, Leaf2 sets the first port as unselected.

Thus, after the second port on Server1 is disabled, upstream traffic can no longer reach Leaf2 via the communication link between the first and second ports. Instead, the upstream traffic is routed to Leaf1 via the third port. This achieves that the upstream traffic from Server1 to the Spine is switched to Leaf1, without passing through Leaf2.

Figure 5:
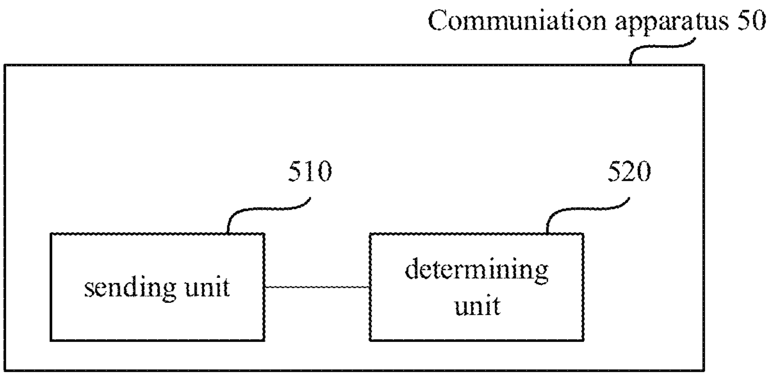
FIG. 5 is a schematic diagram illustrating a structure of a communication apparatus based on an example of the present disclosure.

Based on the same inventive concept, the present disclosure further provides a corresponding communication apparatus. Refer to FIG. 5, which illustrates a communication apparatus 50 provided in an embodiment of the present disclosure. The apparatus 50 is applicable to a first network apparatus, and is part of an M-LAG network, the M-LAG network further including a second network apparatus. A Peerlink established between the first and second network apparatuses is failed. The apparatus comprises: a sending unit 510 and a determining unit 520.

The sending unit 510 is to, in response to a determination that a first forwarding entry included in the first network apparatus and used for forwarding service traffic is not aged, forward service traffic based on the first forwarding entry.

The sending unit 510 is further to send a first packet to a third network apparatus in response to the determining unit 520 determinates that the first network apparatus is a network apparatus performing traffic switchover, so that the third network apparatus is to regenerate a forwarding path to reach a target network apparatus through the second network apparatus.

The third network apparatus is an apparatus accessed by both the first and second network apparatuses, and a path from the third network apparatus to the first network apparatus and a path from the third network apparatus to the second network apparatus are equal-cost paths.

Optionally, the first network apparatus includes a first port, and the target network apparatus includes a second port; a communication link is established between the first port and the second port, the first port and the second port belong to a same aggregation group.

The sending unit 510 is to send an LACP packet to the target network apparatus which includes the first port's port status, so that the target network apparatus is to determine based on the port status that the first port has not completed aggregation and disable the sending and receiving functions of the second port on the communication link.

Additionally, the apparatus further comprises a setting unit (not shown) to set the first port as unselected, wherein the port status including a Sync bit set to 0.

Optionally, a Keepalive link is established between the first and second network apparatuses.

The apparatus further includes: an acquiring unit (not shown), is to acquire a first apparatus attribute of the first network apparatus;

a receiving unit (not shown), is to receive a first Keepalive packet sent by the second network apparatus via the Keepalive link; wherein the first Keepalive packet comprises a second apparatus attribute of the second network apparatus.

The determining unit 520 is to determine an attribute relationship between the first apparatus attribute and the second apparatus attribute; and determine the first network apparatus is the network apparatus performing traffic switchover if the attribute relationship indicates that the second network apparatus is a primary apparatus and the first network apparatus is a secondary apparatus.

Optionally, the acquiring unit (not shown) may further acquire a first routing entry reaching the target network apparatus from a first routing table; wherein the first routing entry indicates a route reaching the target network apparatus through the first network apparatus.

The sending unit 510 may send the first packet carrying a first route to the third network apparatus so that the third network apparatus is to delete a sub-routing entry contained in a second routing entry corresponding to the first route from a second routing table and delete a sub-forwarding entry in a forwarding table based on the sub-routing entry.

Optionally, the acquiring unit (not shown) may further acquire a first prefix entry reaching the target network apparatus from an LSDB.

The apparatus further comprises an updating unit (not shown), configured to update a first cost value in the first prefix entry to a second cost value. Where the updated first prefix entry indicates a route reaching the target network apparatus through the first network apparatus.

The updating unit is configured to update a local shortest path tree based on the updated first prefix entry; wherein the shortest path tree includes the updated first route, the updated first route includes the second cost value, and the updated first route indicates a route reaching the target network apparatus through the first network apparatus.

The sending unit 510 transmits the first packet, including the updated first prefix entry to the third network apparatus, prompting the third network apparatus to delete a sub-routing entry contained in a second routing entry corresponding to the updated first prefix entry from a second routing table and delete a sub-forwarding entry in the forwarding table based on the sub-routing entry.

Therefore, by utilizing the proposed communication apparatus provided in the present disclosure, traffic is forwarded by the first network apparatus based on the first forwarding entry if the first forwarding entry for forwarding traffic is not aged. If the first network apparatus is determined for performing traffic switchover, it may send a first packet to the third network apparatus, prompting the third network apparatus to regenerate the forwarding path to reach the target network apparatus via the second network apparatus. The third network apparatus is an apparatus accessed by both the first network apparatus and the second network apparatus, and has equal-cost paths to both the first and second network apparatuses, ensuring seamless traffic switchover without packet loss.

As such, in an M-LAG network without traffic on the Peerlink link, if a Peerlink failure occurs, by determining the network apparatus for performing traffic switchover, the traffic in the network apparatus can be seamlessly switched, achieving zero packet loss without affecting services. This solves the problem of packet loss of traffic and its impact on the services during the process of the uplink and downlink interfaces in the exiting MAD mechanism.

Figure 6:
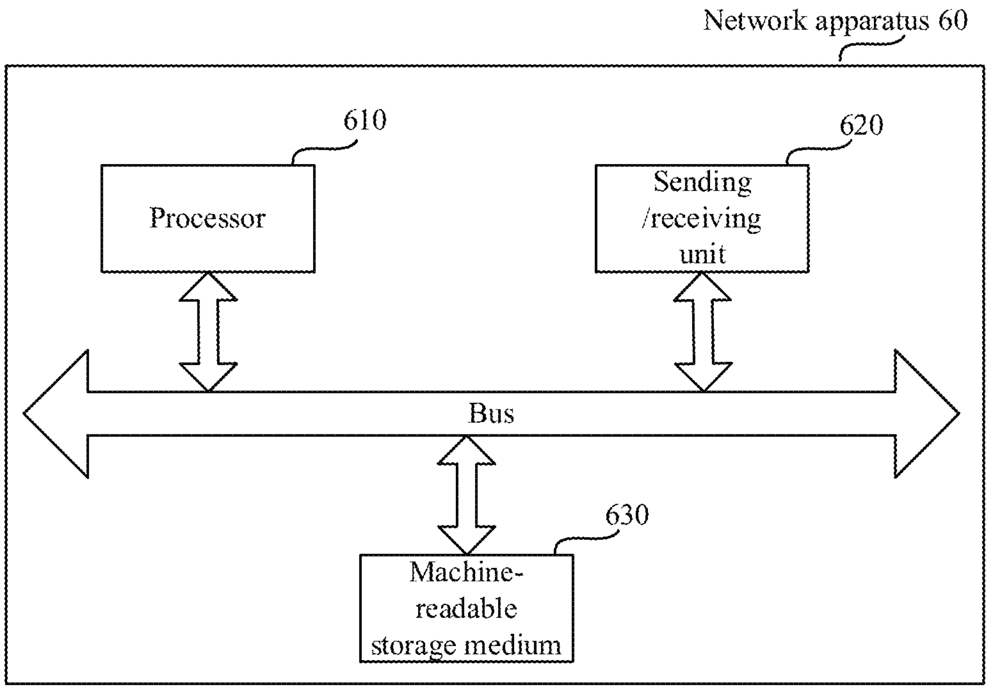
FIG. 6 is a schematic diagram illustrating a structure of a network apparatus based on an example of the present disclosure.

Based on the same inventive concept, a network apparatus 60, as shown in FIG. 6, is also provided according to an embodiment of the present disclosure. The network apparatus 60 includes a processor 610, a sending/receiving unit 620, and a machine-readable storage medium 630. The machine-readable storage medium 630 stores executable instructions that, when executed by the processor 610, perform the communication method described in this embodiment. The communication apparatus shown in FIG. 5 can be implemented with the hardware structure shown in FIG. 6.

The machine-readable storage medium 630 may include a Random-Access Memory (RAM) and may further include a non-volatile memory (NVM), such as a disk storage. Optionally, the machine-readable storage medium 630 can further be at least a storage apparatus remote from the processor 610.

The processor 610 can be a general processor, including a Central Processing Unit (CPU), a Network Processor (NP), etc. It can also be a Digital Signal Processor (DSP), an Application Specific Integrated Circuit (ASIC), a Field-Programmable Gate Array (FPGA), other programmable logic devices, discrete gates or transistor logic devices, or discrete hardware components.

In this embodiment, the processor 610 reads the machine-executable instructions stored in the machine-readable storage medium 630 which enable the processor 610 itself to perform the described communication method according to the embodiment of the present disclosure by invoking the sending/receiving 620.

Furthermore, a machine-readable storage medium 630 storing machine-executable instructions is also provided. When invoked and executed by the processor 610, these instructions enable the processor and sending/receiving unit to perform the described communication method according to the embodiment of the present disclosure.

The functions and processes of each unit in the communication apparatus correspond to the processes described in the method embodiments and are not repeated here.

As for the apparatus embodiment, since it basically corresponds to the method embodiment. It is sufficient to refer to the corresponding part of the description of the method embodiment. The embodiments of the communication apparatus above are merely schematic, where components shown as a unit can be a physical unit or not a physical unit, i.e. can be in one location or distributed among several network units. Part or all of the modules may be selected according to the actual needs to implement the objective of the solution of the present disclosure. Those skilled in the art can understand and implement the solution of the present disclosure without creative work.

For embodiments of the communication apparatus and the machine-readable storage medium, since the method content involved in the communication apparatus is similar to the foregoing method embodiments, the description is relatively simple, and reference can be made to the corresponding part of the method embodiments.

The above descriptions are merely preferred embodiments of the present disclosure, and are not intended to limit the present disclosure. Any modifications, equivalent replacements, or improvements, etc., within the spirit and principles of the present disclosure are included in the scope of the disclosure.

The invention claimed is:

1. A communication method, applied to a first network apparatus in a network of a Multichassis Link Aggregation Group (M-LAG); the network of the M-LAG further comprises a second network apparatus, wherein a Peerlink link established between the first network apparatus and the second network apparatus is faulty, the method comprising:

forwarding, by the first network apparatus, the traffic based on a first forwarding entry, wherein the first forwarding entry for forwarding traffic comprised in the first network apparatus is not aged;

acquiring a first prefix entry reaching the target network apparatus from a local Link State Database (LSDB), and updating a first cost value in the first prefix entry to a second cost value, the updated first prefix entry indicating a route reaching the target network apparatus through the first network apparatus;

updating a local shortest path tree based on the updated first prefix entry; wherein the shortest path tree includes an updated first route, the updated first route includes the second cost value, and the updated first route indicates a route reaching the target network apparatus through the first network apparatus; and sending, by the first network apparatus in response to a determination that the first network apparatus is a network apparatus performing traffic switchover, a first packet to a third network apparatus, comprising: sending the first packet carrying the updated first prefix entry to the third network apparatus, so that the third network apparatus is to regenerate a forwarding path to reach a target network apparatus through the second network apparatus, and delete a sub-routing entry contained in a second routing entry corresponding to the updated first prefix entry from a second routing table and delete a sub-forwarding entry in the forwarding table based on the sub-routing entry;

wherein the third network apparatus is an apparatus accessed by both the first network apparatus and the second network apparatus, and a path from the third network apparatus to the first network apparatus and a path from the third network apparatus to the second network apparatus are equal-cost paths.

2. The method according to claim 1, wherein the first network apparatus comprises a first port, the target network apparatus comprises a second port, a communication link is established between the first port and the second port, the first port and the second port belong to a same aggregation group, the method further comprising:

sending a Link Aggregation Control Protocol (LACP) packet to the target network apparatus, the LACP packet carrying a port status of the first port, so that the target network apparatus is to determine, based on the port status, that the first port has not completed aggregation, and disable a receiving and sending function of the second port on the communication link;

setting the first port as a non-selected port;

wherein the port status includes a Sync bit, and a value of the Sync bit is 0.

3. The method according to claim 1, wherein a Keepalive link is established between the first network apparatus and the second network apparatus;

after forwarding the traffic based on the first forwarding entry, the method further comprises:

acquiring a first apparatus attribute of the first network apparatus;

receiving a first Keepalive packet sent from the second network apparatus via the Keepalive link; wherein the first Keepalive packet includes a second apparatus attribute of the second network apparatus;

determining that the first network apparatus is the network apparatus performing traffic switchover comprising:

determining an attribute relationship by comparing the first apparatus attribute and the second apparatus attribute;

determining the first network apparatus is the network apparatus performing traffic based on the attribute relationship indicating that the second network apparatus is a primary apparatus and the first network apparatus is a secondary apparatus.

4. The method according to claim 1, wherein prior to sending the first packet to the third network apparatus, the method further comprises:

acquiring a first routing entry reaching the target network apparatus from a first routing table; wherein the first routing entry indicates a route reaching the target network apparatus through the first network apparatus;

sending the first packet to the third network apparatus, comprising:

sending the first packet carrying a first route to the third network apparatus so that the third network apparatus is to delete a sub-routing entry contained in a second routing entry corresponding to the first route from a second routing table and delete a sub-forwarding entry in a forwarding table based on the sub-routing entry.

5. A communication apparatus, applied to a first network apparatus in a network of a Multichassis Link Aggregation Group (M-LAG); the network of the M-LAG further comprises a second network apparatus, wherein a Peerlink link established between the first network apparatus and the second network apparatus is faulty, the communication apparatus comprising:

a processor and a non-transitory storage medium storing machine executable instructions, wherein by executing the machine executable instructions, the processor is caused to:

forward traffic based on a first forwarding entry comprised in the first network apparatus in response to the first forwarding entry for forwarding the traffic is not aged;

acquire a first prefix entry reaching the target network apparatus from a local Link State Database (LSDB);

update a first cost value in the first prefix entry to a second cost value; the updated first prefix entry indicates a route reaching the target network apparatus through the first network apparatus;

update a local shortest path tree based on the updated first prefix entry; wherein the shortest path tree includes an updated first route, the updated first route includes the second cost value, and the updated first route indicates a route reaching the target network apparatus through the first network apparatus; and send a first packet to a third network apparatus in response to determining that the first network apparatus is a network apparatus performing traffic switchover, comprising: sending the first packet carrying the updated first prefix entry to the third network apparatus, so that the third network apparatus is to regenerate a forwarding path to reach a target network apparatus through the second network apparatus, and delete a sub-routing entry contained in a second routing entry corresponding to the updated first prefix entry from a second routing table and delete a sub-forwarding entry in the forwarding table based on the sub-routing entry;

wherein the third network apparatus is an apparatus accessed by both the first network apparatus and the second network apparatus, and a path from the third network apparatus to the first network apparatus and a path from the third network apparatus to the second network apparatus are equal-cost paths.

6. The communication apparatus according to claim 5, wherein the first network apparatus comprises a first port, the target network apparatus comprises a second port, a communication link is established between the first port and the second port, the first port and the second port belong to a same aggregation group, the processor is further caused to: send a Link Aggregation Control Protocol (LACP) packet carrying a port status of the first port to the target network apparatus, so that the target network apparatus is to determine based on the port status that the first port has not completed aggregation and disable a receiving and a sending function of the second port on the communication link;

set the first port as a non-selected port;

wherein, the port status includes a Sync bit, and a value of the Sync bit is 0.

7. The communication apparatus according to claim 5, wherein a Keepalive link is established between the first network apparatus and the second network apparatus;

after forwarding the traffic based on the first forwarding entry, the processor is further caused to:

acquire a first apparatus attribute of the first network apparatus;

receive a first Keepalive packet sent from the second network apparatus via the Keepalive link; wherein the first Keepalive packet comprises a second apparatus attribute of the second network apparatus;

the determining that the first network apparatus is a network apparatus performing traffic switchover comprises: determining an attribute relationship by comparing the first apparatus attribute and the second apparatus attribute; and determining the first network apparatus is the network apparatus performing traffic switchover based on the attribute relationship indicating that the second network apparatus is a primary apparatus and the first network apparatus is a secondary apparatus.

8. The communication apparatus according to claim 5, wherein before sending the first packet to the third network apparatus, the processor is further caused to:

acquire a first routing entry reaching the target network apparatus from a first routing table;

wherein the first routing entry indicates a route reaching the target network apparatus through the first network apparatus;

the sending the first packet to the third network apparatus comprises: sending the first packet carrying a first route to the third network apparatus so that the third network apparatus is to delete a sub-routing entry contained in a second routing entry corresponding to the first route from a second routing table and delete a sub-forwarding entry in a forwarding table based on the sub-routing entry.

* * * * *